(12) United States Patent
Lo

(10) Patent No.: US 10,015,415 B2
(45) Date of Patent: Jul. 3, 2018

(54) LIGHT FIELD CAMERA

(71) Applicant: Coretronic Corporation, Hsin-Chu (TW)

(72) Inventor: Hsin-Hsiang Lo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/584,035

(22) Filed: May 2, 2017

(65) Prior Publication Data

US 2017/0324912 A1    Nov. 9, 2017

(30) Foreign Application Priority Data

May 5, 2016 (CN) .......................... 2016 1 0292228

(51) Int. Cl.
*H04N 5/349* (2011.01)
*G02B 3/00* (2006.01)
*H04N 5/225* (2006.01)

(52) U.S. Cl.
CPC ........... *H04N 5/349* (2013.01); *G02B 3/0006* (2013.01); *H04N 5/2259* (2013.01)

(58) Field of Classification Search
CPC ..................................................... H04N 5/349
See application file for complete search history.

(56) References Cited

U.S. PATENT DOCUMENTS

| 8,102,459 B2* | 1/2012 | Hayasaka | H01L 27/14627 348/335 |
| 8,531,581 B2* | 9/2013 | Shroff | H04N 5/23212 348/335 |
| 8,836,844 B2 | 9/2014 | Hiasa et al. | |
| 8,976,288 B2 | 3/2015 | Ng et al. | |
| 9,063,323 B2* | 6/2015 | DiFrancesco | H04N 5/2254 |
| 9,063,345 B2* | 6/2015 | DiFrancesco | G02B 13/00 |

(Continued)

FOREIGN PATENT DOCUMENTS

CN          104580877          4/2015

OTHER PUBLICATIONS

Chuan-Chung, Chang et al., "Localized High Dynamic Range Plenoptic Image Compression," Society for Imaging Science and Technology, Feb. 2017, pp. 1-6.

*Primary Examiner* — Cynthia Segura
(74) *Attorney, Agent, or Firm* — JCIPRNET

(57) ABSTRACT

A light field camera includes a lens module generating a middle image, a light field sensor having a lens array and an image sensor device, and a position adjuster adjusting a position of the light field sensor. The light field camera is between an object side and an image side. The lens array between the lens module and the image side generates a light field image according to the middle image. The image sensor device is arranged at the image side and senses the light field image. When the light field sensor is at a first or second position, the light field image includes a first or second light field sub-image. A relation of a focal length $f_{MLA}$ of the lens array and an exit pupil distance $P_{EXP}$ of the lens module satisfies $$0.7 \leq \frac{f_{MLA}}{P_{EXP}} \leq 1.3.$$

15 Claims, 8 Drawing Sheets

(56) References Cited

U.S. PATENT DOCUMENTS

| | | | |
|---|---|---|---|
| 9,197,799 B2* | 11/2015 | DiFrancesco | G02B 3/0056 |
| 9,219,866 B2* | 12/2015 | Shroff | G01N 21/27 |
| 2015/0077622 A1* | 3/2015 | Ueno | G02B 13/0055 |
| | | | 348/360 |
| 2017/0201667 A1* | 7/2017 | Chang | G06T 5/001 |
| 2017/0293148 A1* | 10/2017 | Park | G02B 3/0006 |

* cited by examiner

LIGHT FIELD CAMERA

CROSS-REFERENCE TO RELATED APPLICATION

This application claims the priority benefit of China application serial no. 201610292228.1, filed on May 5, 2016. The entirety of the above-mentioned patent application is hereby incorporated by reference herein and made a part of this specification.

BACKGROUND OF THE INVENTION

Field of the Invention

The invention relates to an optical apparatus; more particularly, the invention relates to a light field camera.

Description of Related Art

According to the light field technologies, the combination of a lens and a lens array in a light field camera can allow the light field camera to record information of positions and viewing angles of images. For instance, before the recorded images are processed and after these images are processed, different parallax may exist between each resultant light field sub-image. After the images having the information of views are processed, the processed images may accomplish the effects of post focus, selective focus, total focus, multiple view angles, image segmentation, and so on. The light field camera may be categorized into three types in terms of its basic structure, i.e., a camera array, a non-focused light field camera, and a focused light field camera.

In the non-focused light field camera, the distance from the lens array to an image sensor is the focal length of the lens array, and the lens array is on the focal length of a main lens group. In said optical structure, pixels that are in different sub-lenses in the lens array and correspond to the same relative positions have the same or similar information of views. After the same or similar pixel data are processed via image processing techniques, the light field sub-images with different information of views can be calculated. The number of pixels of the light field sub-images is less than the total number of pixels of the image sensor; besides, if the light field sub-images are required to include more information of views, the number of pixels of each light field sub-image is reduced in response to the increasing information of views. This is similar to the lens array structure. After the information of views of the sub-images with low resolution is fully processed, the image may accomplish the effects of re-focus, selective focus, depth image, multiple view angles, and so on.

The focused light field camera can be considered as a combination of a lens array and a non-focused light field camera. The optical structure of the focused light field camera is the same as that of the non-focused light field camera; however, the lens array in the focused light field camera is not arranged at the focus of the main lens group but arranged at the focus in front of or at the back of the lens array. At this time, the lens array acts as the camera array and re-generates the image generated by the main lens group. Hence, in the focused light field camera, the recorded image is similar to that recorded by the camera array. Different parallax exists between each resultant light field sub-image, and after the sub-images are processed, the effects achieved by the focused light field camera are similar to those accomplished by the other two types of light field cameras.

To obtain favorable sub-image coverage according to the related art, the diaphragms of the optical devices (i.e., the main lens group and the lens array) in the system of either the focused light field camera or the non-focused light field camera are designed to be matched. For instance, the main lens group provided in the related art is the zooming lens group. When the zoom-in or zoom-out function is performed, the diaphragm value and the location of the main lens group are often changed. To prevent the changes of the size of the light field sub-images resulting from the zooming main lens group, the zooming lens group is designed to have the fixed diaphragm value according to the related art. With the feature of the fixed diaphragm value, the changes to the size of the light field sub-images may be reduced; however, the selectivity of the light field lens is also compromised.

Therefore, according to the related art, in order to keep the variations in the size of the light field sub-images to be within a relatively small range, the main lens group with the fixed diaphragm value can be employed, or the main lens group can be further monitored, such that the size of the diaphragm can be changed in response to the zooming status of the main lens group. Alternatively, the distance between the main lens group and the image sensor can be changed while the main lens group performs the zoom-in or zoom-out function. Nevertheless, even though the same lens array is employed, if the main lens group is a fixed-focus lens group, the light field camera having the fixed-focus main lens group cannot achieve the effects of changing the views and while keeping the variations of the light field sub-images within an acceptable range. Moreover, if the main lens group is the zooming lens group, the view of the processed light field image is often restricted by the zooming range of the main lens group, and therefore it is unlikely to accomplish any additional effects of changing the views of the light field image.

The information disclosed in this "Description of Related Art" section is only for enhancement of understanding of the background of the invention and therefore it may contain information that does not form the prior art that is already known to a person of ordinary skill in the art. Furthermore, the information disclosed in this "Description of Related Art" section does not mean that one or more problems to be resolved by one or more embodiments of the invention were acknowledged by a person of ordinary skill in the art.

SUMMARY OF THE INVENTION

The invention provides a light field camera. Here, the variations in light field sub-images generated by the light field camera can be reduced, i.e., the size of the image can be limited to a certain degree.

Other objects and advantages of the invention can be further illustrated by the technical features broadly embodied and described as follows.

In order to achieve one or a portion of or all of the objects or other objects, an embodiment of the invention provides a light field camera that includes a lens module, a light field sensor, and a position adjuster. The light field sensor includes a lens array and an image sensor device. The lens module is arranged between an object side and an image side. The lens module is configured to generate a middle image. The lens array is arranged between the lens module and the image side. The lens array is configured to generate a light field image according to the middle image. The image sensor device is arranged at the image side. The image sensor device is configured to sense the light field image.

The position adjuster is configured to adjust a position of the light field sensor. When the light field sensor is at a first position, the light field image includes a first light field sub-image. When the light field sensor is at a second position, the light field image includes a second light field sub-image. A relation between a focal length $f_{MLA}$ of the lens array and an exit pupil distance $P_{EXP}$ of the lens module satisfies $$0.7 \leq \frac{f_{MLA}}{P_{EXP}} \leq 1.3.$$

In view of the above, the light field camera provided herein may achieve at least one of advantages or effects as described below. In an embodiment of the invention, the ratio of sizes of the light field sub-images taken by the light field sensor at different positions complies with the predetermined standard. Hence, variations of the light field sub-images can be reduced in the light field camera provided herein.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
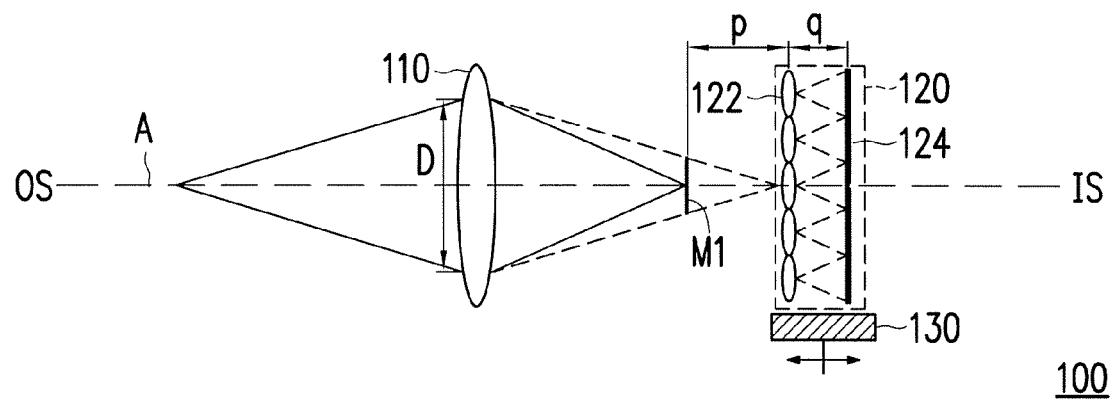
FIG. 1 is schematic brief view illustrating a light field camera according to an embodiment of the invention.
Figure 2:
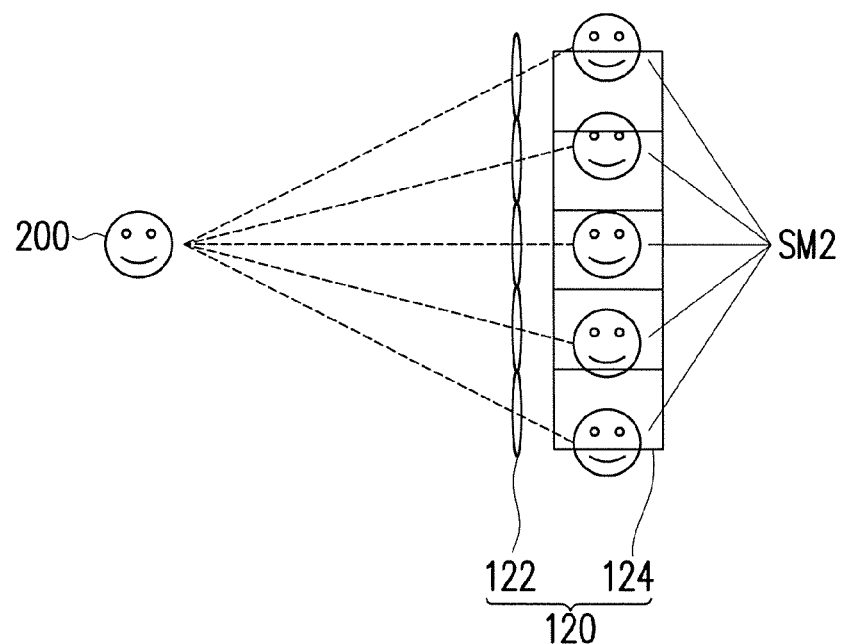
FIG. 2 is schematic brief view illustrating that the light field camera depicted in FIG. 1 senses sub-images.

FIG. 1 is schematic brief view illustrating a light field camera according to an embodiment of the invention. FIG. 2 is schematic brief view illustrating that the light field camera depicted in FIG. 1 senses sub-images. With reference to FIG. 1 and FIG. 2, the light field camera 100 provided in the embodiment includes a lens module 110, a light field sensor 120, and a position adjuster 130. The light field sensor 120 includes a lens array 122 and an image sensor device 124. In the embodiment, the lens module 110 is located between an object side OS and an image side IS. The lens module 110 is configured to generate a middle image M1. The lens module 110 has an exit pupil diameter D. The lens module 110 is, for instance, a fixed-focus lens group or a zooming lens group. In the embodiment of the invention, the lens module 110 includes a main lens group. The main lens group includes one or more non-planar optical lenses or a combination of planar and non-planar optical lenses, for instance. The non-planar optical lenses may include biconcave lenses, biconvex lenses, concave-convex lenses, convex-concave lenses, plane-convex lenses, plane-concave lenses, and so on, for instance. The type of the main lens group of the lens module 110 and the types of the lenses included in the main lens group are not limited in the embodiment.

In the embodiment, the lens array 122 is located between the lens module 110 and an image side IS. The lens array 122 is configured to generate a light field image according to the middle image M1. The lens array 122 is selected from one of a refractive micro-lens array and a diffractive micro-lens array, for instance. The form and the type of the lens array 122 are not limited herein.

In the embodiment, the image sensor device 124 is arranged at/near the image side IS. The image sensor device 124 is configured to sense the light field image generated by the lens array 122. For instance, the image sensor device 124 includes a charge coupled device (CCD) image sensor, a complementary metal oxide semiconductor (CMOS) image sensor, or any other similar apparatus, which should however not be construed as a limitation to the invention.

With reference to FIG. 2, in the field pertinent to the light field camera, the "view angle" of the lens array 122 means that an object can be observed at different angles by the light field camera; alternatively, the "view angle" refers to the sub-images sensed in several sensing areas by the image sensor device 124, as shown in FIG. 2. Images of the object 200 are generated in the sensing area of the image sensor device 124 through the lens array 122. Hence, each sub-lens of the lens array 122 can have a sub-image SM2 generated in the corresponding sensing area of the image sensor device 124. In the embodiment, there are five sub-images SM2, which indicates that the lens array 122 has five view angles, and that the light field sub-images of the object 200 at different angles can be taken by the lens array 122 at different positions. In FIG. 2, for clear illustration, the sub-images SM2 taken by the image senor device 122 are shown along the optical axis A from the object side OS to the image side IS, as illustrated in FIG. 1. Besides, the number of the sub-lenses of the lens array 122 and the number of the sensing areas of the image sensor device 124 as shown in FIG. 1 and FIG. 2 are merely exemplary and should not be construed as limitations to the invention.

Figure 3:
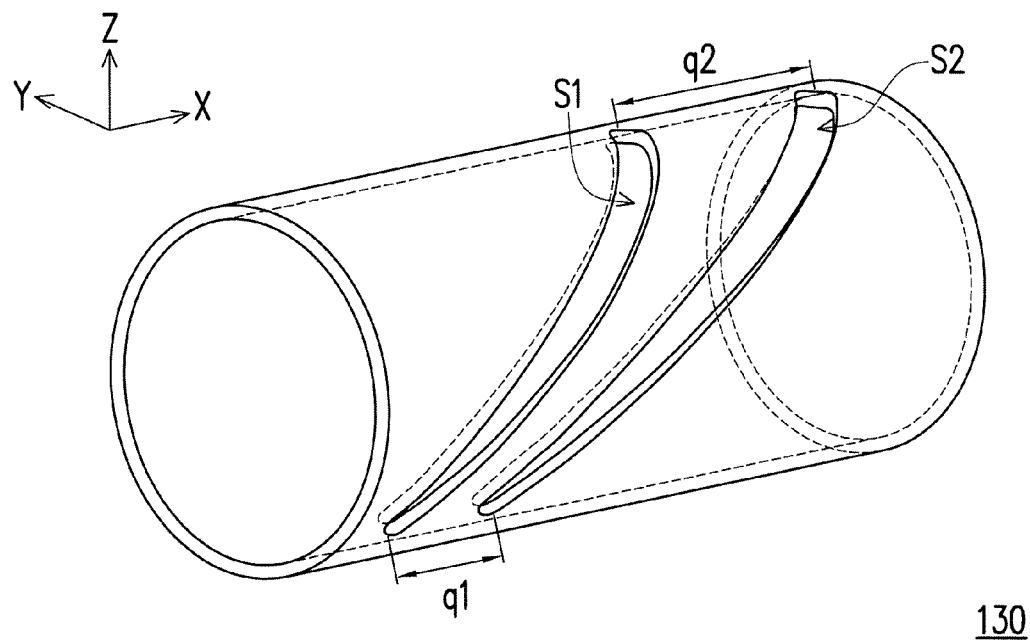
FIG. 3 and FIG. 4 are schematic brief views illustrating the position adjuster depicted in FIG. 1 at different view angles.
Figure 4:
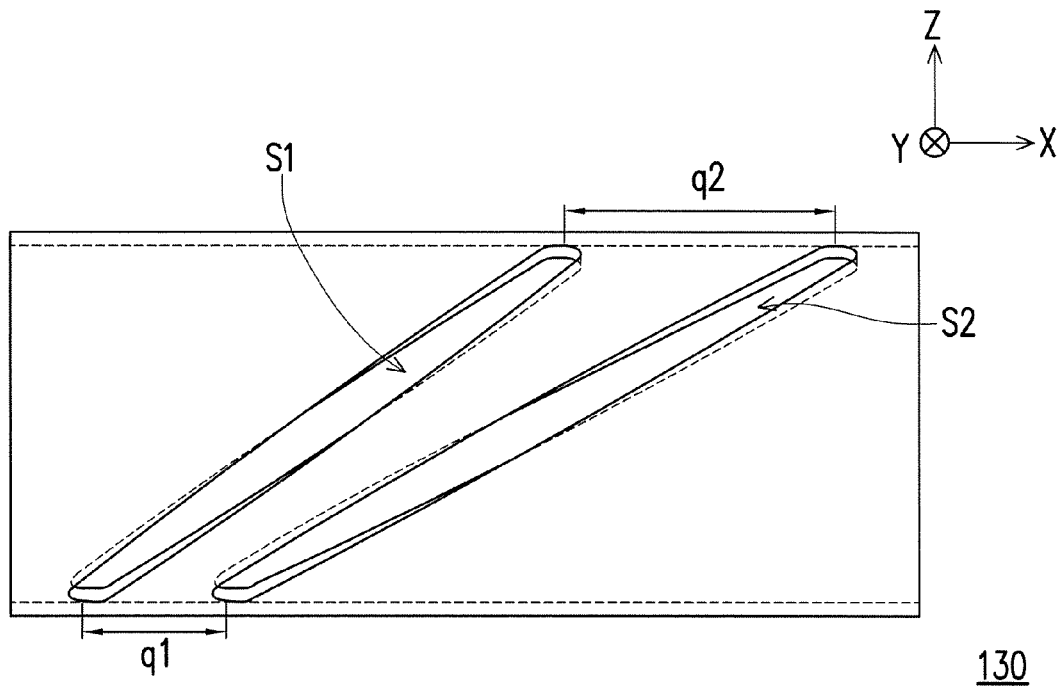
Figure 5:
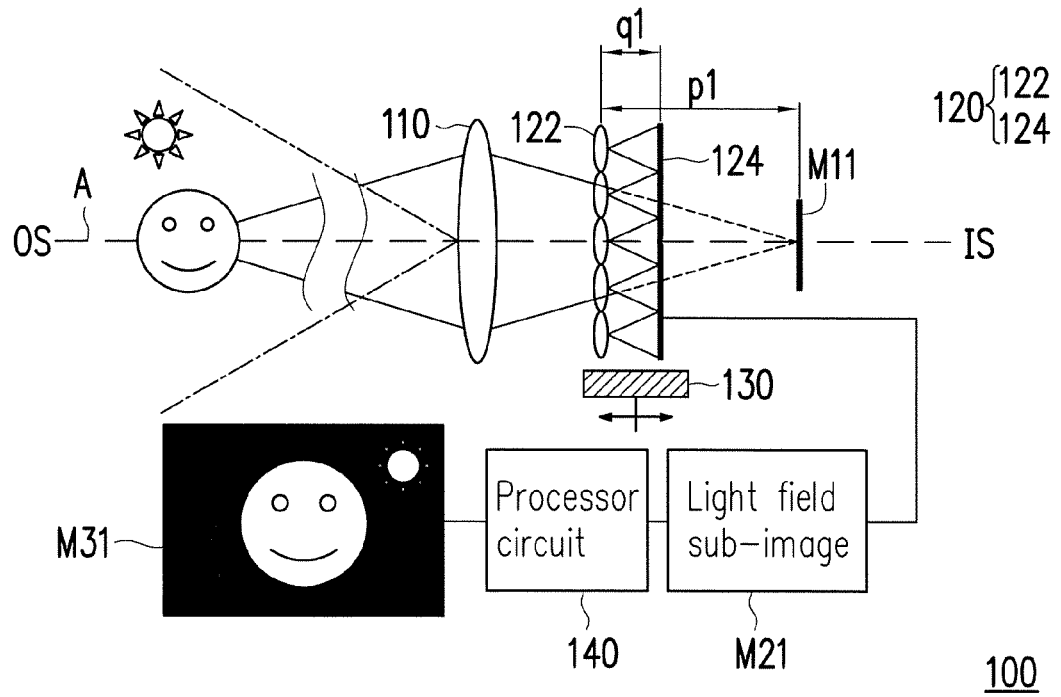
FIG. 5 and FIG. 6 are schematic brief views illustrating the light field sensor of the light field camera depicted in FIG. 1 at a first position and a second position.
Figure 6:
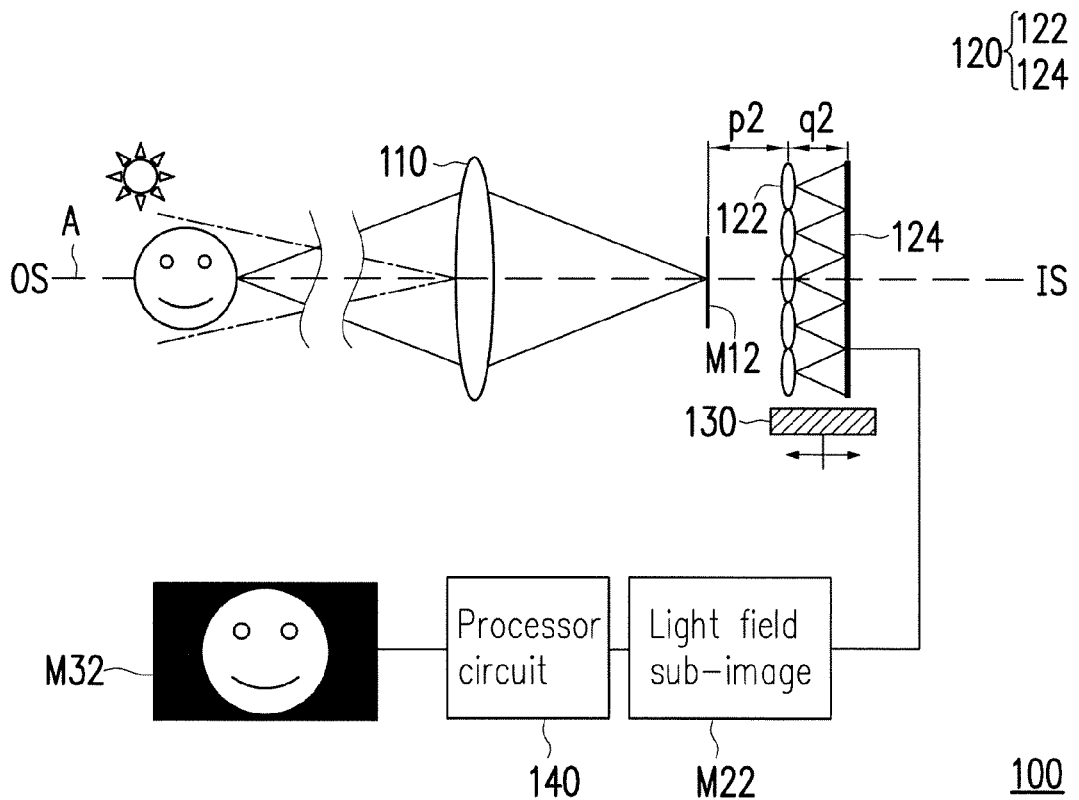

FIG. 3 and FIG. 4 are schematic brief views illustrating the position adjuster depicted in FIG. 1 at different view angles. In the embodiment, the position adjuster 130 is configured to adjust a position of the light field sensor 120, e.g., from a first position to a second position. FIG. 5 and FIG. 6 are schematic brief view angles illustrating the light field sensor of the light field camera depicted in FIG. 1 at a first position and a second position. With reference to FIG. 3 to FIG. 6, in the embodiment, the position adjuster 130 is, for instance, a rotation mechanism including two traces S1 and S2. The lens array 122 and the image sensor device 124 having protrutions through traces S1 and S2 may adjust the locations of the lens array 122 and the image sensor device 124, respectively. In the embodiment, the position adjuster 130 switches the position of the lens sensor 120 from the first position to the second position through rotation, for instance, and the distance from the lens array 122 to the image sensor device 124 on the optical axis A is adjusted from a pitch q1 to a pitch q2. Hence, in the embodiment, the position adjuster 130 can switch the light field sensor 120 to two different positions, i.e., the first position and the second position, and the position adjuster 130 can simultaneously adjust the pitch between the lens array 122 and the image sensor device 124. That is, in the embodiment, when the light field sensor 120 is at the first position and the second position, the pitches q1 and q2 from the lens array 122 to the image sensor device 124 on the optical axis A are different, and so are the pitches p1 and p2 from the middle images M11 and M12 to the lens array 122 on the optical axis A. Besides, in the embodiment, when the light field sensor 120 is at the first position, the middle image M11 is generated at a position behind the light field sensor 120. When the light field sensor 120 is at the second position, the middle image M12 is generated at a position between the lens module 110 and the light field sensor 120. That is, when the light field sensor 120 is at the first position or the second position, the conjugate plane relation between the light field sensor 120 and the imaging plane of the lens module 110 is satisfied. In the embodiment, the conjugate plane relation means that the middle image (M11 or M12) is re-generated on the image sensor device 124 through the lens array 122 after the lens module 110 performs the imaging function. Besides, in the embodiment, the structure of the position adjuster 130 is exemplary, and the form and the type of the position adjuster 130 are not limited in the invention.

Different from FIG. 1, FIG. 5 and FIG. 6 depict a processor circuit 140 that is configured to process light field sub-images M21 and M22 output by the image sensor device 124. In the embodiment, the processor circuit 140 is configured to perform a light field image rendering process on the light field sub-images M21 and M22, i.e., parts of the light field sub-images M21 and M22 are retrieved and rendered to generate completing light field images M31 and M32. In the embodiment, the method of performing the light field image rendering process may be carried out by performing any appropriate image processing algorithm in the pertinent field, which should not be considered as a limitation to the invention. Teachings and suggestions of the detailed steps and the way to implement the method should be known to people in the pertinent field. During image processing, the individual images sensed by the image sensor device 124 are light field sub-images, and these light field sub-images are rendered to generate the light field image. Therefore, no further explanations will be further provided hereinafter.

In the embodiment, the processor circuit 140 includes, for instance, a central processing unit (CPU), a microprocessor, a digital signal processor (DSP), a programmable controller, a programmable logic device (PLD), any other similar apparatus, or a combination thereof, which should not be construed as limitations to the invention. Besides, in an embodiment of the invention, each operating function of the processor circuit 140 may be implemented in form of programming codes. These programming codes are stored in one memory and executed by the processor circuit 140. Alternatively, in an embodiment of the invention, each operating function of the processor circuit 140 may be implemented in fours of one or more circuits. In the invention, the operating functions of the processor circuits 140 can be implemented by software or hardware, which should however not be construed as a limitation to the invention.

Figure 7:
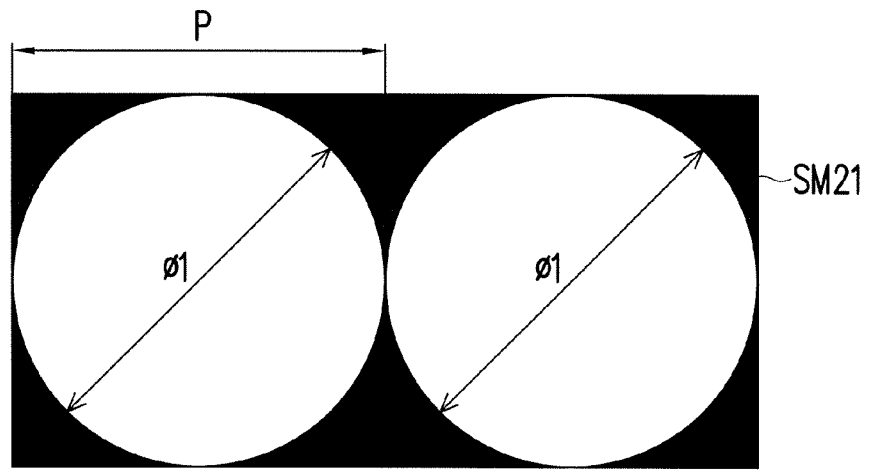
FIG. 7 is schematic brief view illustrating a first light field sub-image according to an embodiment of the invention.
Figure 8:
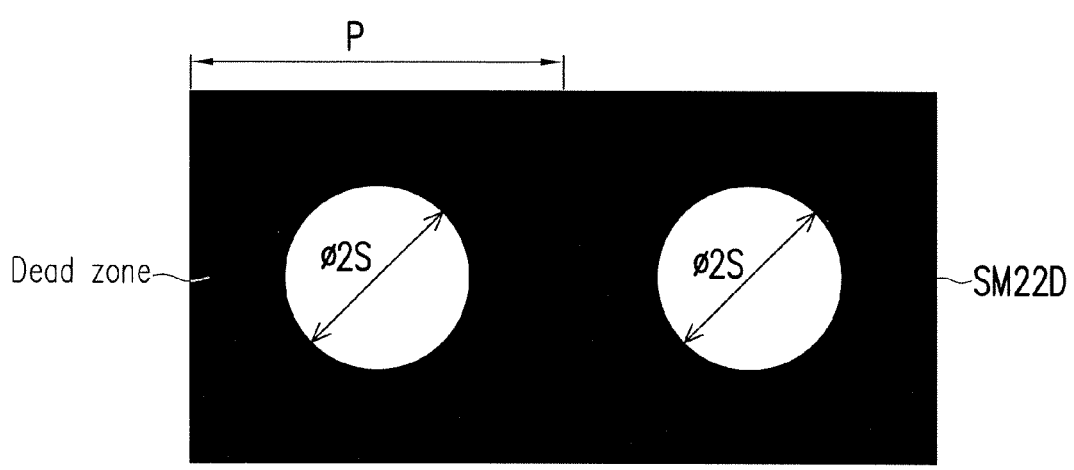
FIG. 8 and FIG. 9 are schematic brief view illustrating a second light field sub-image according to different embodiments of the invention.
Figure 9:
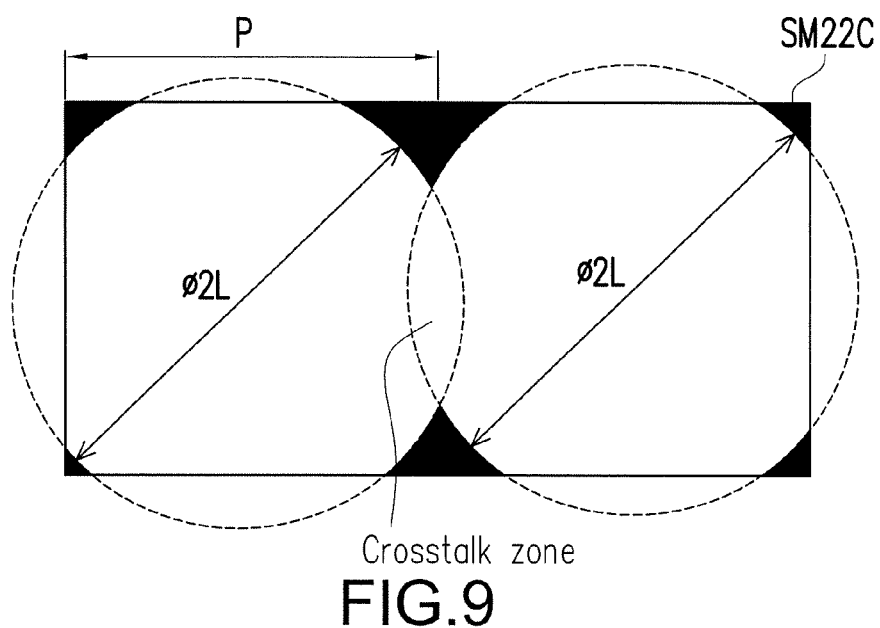

FIG. 7 is schematic brief view illustrating a first light field sub-image according to an embodiment of the invention. FIG. 8 and FIG. 9 are schematic brief view illustrating a second light field sub-image according to different embodiments of the invention. With reference to FIG. 5 to FIG. 9, two adjacent light field sub-images are exemplarily shown in FIG. 7 and FIG. 9, whereas the number of the light field sub-images should not be construed as a limitation to the invention. In FIG. 5 and FIG. 7, when the light field sensor 120 is at the first position, the light field sub-image M21 includes a first light field sub-image SM21, a size of the first light field sub-image SM21 is Ø1, and the pitch between two light field sub-images is P. In FIG. 6, FIG. 8, and FIG. 9, when the light field sensor 120 is at the second position, the light field sub-image M22 includes a second light field sub-image SM22D or SM22C (dependent on the design of the lens module 110 and the lens array 122), and a size of the second light field sub-image SM22D or SM22C is Ø2S or Ø2L.

Specifically, in the embodiment, a ratio of the focal length $f_{MLA}$ of the lens array 122 to the exit pupil distance $P_{EXP}$ of the lens module 110 is determined according to a formula (1):

$$\frac{f_{MLA}}{D} = \frac{m^2 \times (1+k) + m \times (1-k)}{(1+k) \times (1-m^2)} \quad (1)$$

Here, k is a ratio k of the size of the second light field sub-image SM22D or SM22C to a size of the first light field sub-image SM21, i.e., k=Ø2S/Ø1 or k=Ø2L/Ø1, and m is a magnification ratio of the lens array 122. As exemplarily shown in FIG. 1, the distance from the middle image M1 to the lens array 122 on the optical axis A is p, the distance from the lens array 122 to the image sensor device 124 on the optical axis A is q, and the magnification ratio m of the lens array 122 is equal to q/p, for instance. The magnification ratio of the lens array shown in FIG. 5 and FIG. 6 can be deduced from the above and thus will not be further described. As exemplarily shown in FIG. 7 and FIG. 8, if k=0.5, the size Ø2S of the second light field sub-image SM22D is 0.5 times smaller than the size Ø1 of the first light field sub-image SM21. That is, after the light field sensor 120 is switched from the first position (as shown in FIG. 5) to the second position (as shown in FIG. 6), the size of the sub-image is 0.5 times smaller than the size of the sub-image before the light field sensor 120 is switched from the first position to the second position. Hence, the resolution of the light field image is significantly sacrificed, the dead zone (i.e., the black zones shown in the drawings) is increased, and the utilization rate of pixels is lowered down. In the embodiment, the dead zone is a region where no image is sensed between the sub-images while each sub-lens of the lens array 122 generates an image on the pixels of the image sensor device 124, for instance.

As exemplarily shown in FIG. 7 and FIG. 9, if k=1.5, the size Ø2L of the second light field sub-image SM22C is 1.5 times larger than the size Ø1 of the first light field sub-image SM21. That is, after the light field sensor 120 is switched from the first position to the second position, the size of the sub-images is 1.5 times larger than the size of the sub-images before the light field sensor 120 is switched from the first position to the second position. Here, the crosstalk zone between the second light field sub-images SM22C is expanded, and almost all of the pixels of the image sensor device 124 are supplied to the regions where the sub-images are sensed. In the embodiment, the crosstalk zone is a region where the sub-images are overlapped while each sub-lens of the lens array 122 generates an image on the pixels of the image sensor device 124, for instance.

Hence, in an embodiment of the invention, 0.7≤k≤1.3, so as to achieve favorable effects of switching view angles of the light field image. When the position of the light field sensor 120 is switched back and forth, the effects of changing the view angles of the image output by the image sensor device 124 can accomplished. At the same time, the predetermined range of k contributes to the reduction of the variations in the size of the sub-images during the switching action and the reduction of the proportion of the dead zone or the crosstalk zone in the light field image, so as to enhance the utilization rate of the pixels. Besides, in an embodiment of the invention, the magnification ratio m is determined to be 0.2 while the lens array 122 is at the first position or at the second position, for instance. The determined magnification ratio m is merely exemplary and should not be construed as a limitation to the invention. Accordingly, in an embodiment of the invention, given the known range of m and k as well as the exit pupil distance $P_{EXP}$ of the lens module, the most appropriate focal length $f_{MLA}$ can be calculated according to the formula (1). Through the determination of the range of k, the quality of the light field image can stay consistent before and after the location of the light field sensor 120 is switched, and the proportion of the dead zone or the crosstalk zone in the light field image can be reduced. A relation between the focal length $f_{MLA}$ of the lens array and the exit pupil distance $P_{EXP}$ of the lens module satisfies:

$$0.7 \leq \frac{f_{MLA}}{P_{EXP}} \leq 1.3$$

In another embodiment of the invention, the relation between the focal length $f_{MLA}$ of the lens array and the exit pupil distance $P_{EXP}$ of the lens module in another light field camera satisfies:

$$0.9 \leq \frac{f_{MLA}}{P_{EXP}} \leq 1.1$$

Figure 10:
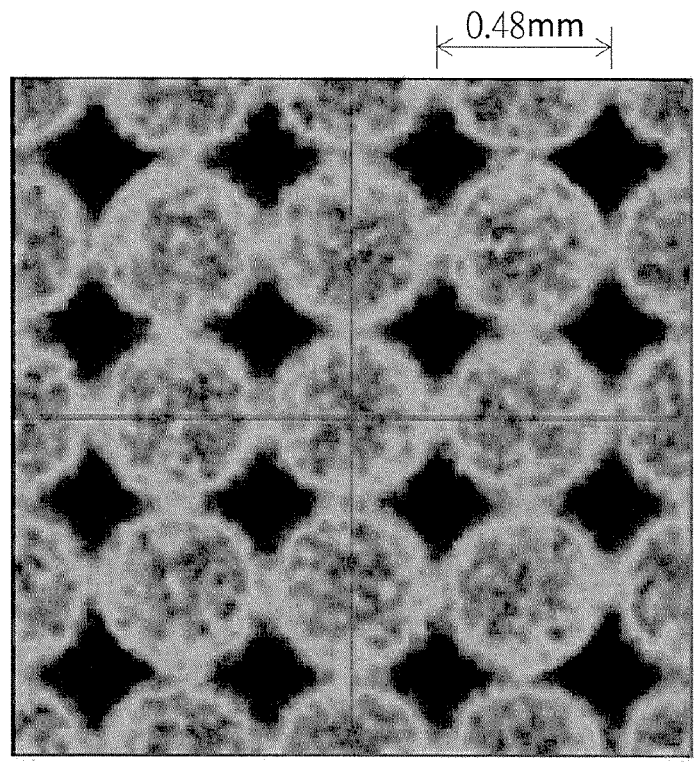
FIG. 10 and FIG. 11 are schematic brief views illustrating light field sub-images output by the light field sensor of the light field camera depicted in FIG. 1 at a first position and a second position according to an embodiment of the invention.
Figure 11:
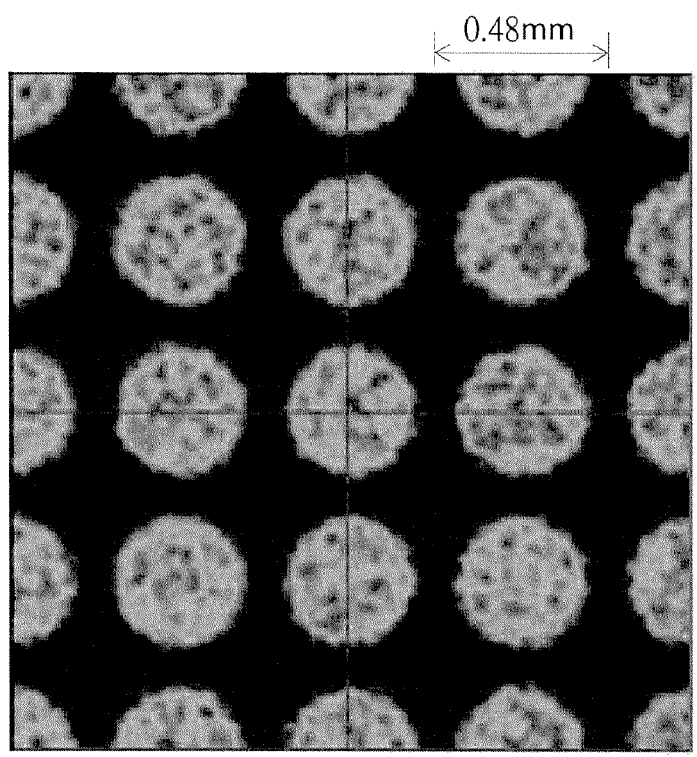
Figure 12:
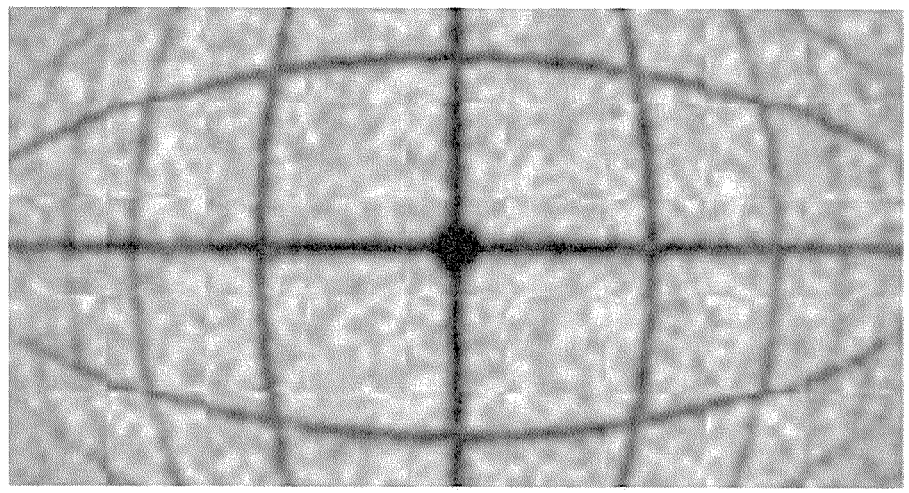
FIG. 12 and FIG. 13 are schematic brief views illustrating light field images output by the light field sensor of the light field camera depicted in FIG. 1 at a first position and a second position according to an embodiment of the invention.
Figure 13:
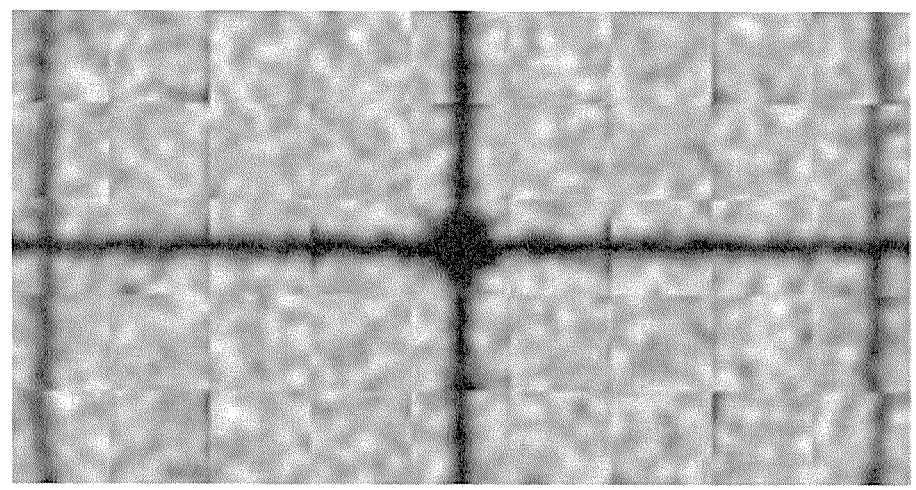

FIG. 10 and FIG. 11 are schematic brief views illustrating light field sub-images output by the light field sensor of the light field camera depicted in FIG. 1 at a first position and a second position according to an embodiment of the invention. FIG. 12 and FIG. 13 are schematic brief views illustrating light field images output by the light field sensor of the light field camera depicted in FIG. 1 at a first position and a second position according to an embodiment of the invention. In the embodiment of the invention, the main lens group of the lens module 110 is a fixed-focus lens group, for instance. When 0.7≤k≤1.3, i.e., the variation range of the size of the rendered light field image at the first position and the second position is 0.7-1.3, and the range of the focal length $f_{MLA}$ of the lens array 122 can be calculated according to the formula (1) as 0.22 mm≤$f_{MLA}$≤1.198 mm. Here, the exit pupil distance $P_{EXP}$ of the lens module 110 is 15.276 mm. In the embodiment, the focal length $f_{MLA}$ of the lens array 122 is 0.9 mm, for instance, and the pixel size P of the image sensor device 124 is 0.48 mm, for instance. The magnification ratio m of the lens array 122 is 0.2, for instance. In FIG. 10, when the light field sensor 120 is at the first position, the size Ø1 of the first light field sub-image is 0.48 mm, for instance. In FIG. 11, when the light field sensor 120 is at the second position, the size Ø2 of the second light field sub-image is 0.36 mm, for instance. Hence, k is 0.75, i.e., k=0.36/0.48=0.75. In FIG. 10, the proportion of the dead zone in the light field sub-image is:

$$\frac{0.48^2 - \pi(0.48/2)^2}{0.48^2} = 22\%$$

In FIG. 11, the proportion of the dead zone in the light field sub-image is:

$$\frac{0.48^2 - \pi(0.36/2)^2}{0.48^2} = 55\%$$

Therefore, in the embodiment, when the light field sensor 120 is at the first position and at the second position, the proportion of the dead zone in the light field image is 22% and 55%, respectively.

With reference to FIG. 12 and FIG. 13, FIG. 12 shows the light field sub-image output by the light field sensor of the light field camera at the first position, and FIG. 13 shows the light field sub-image output by the light field sensor of the light field camera at the second position. It can be learned from FIG. 12 and FIG. 13 that the effects of changing the views of the light field camera can be achieved after the position of the light field sensor 120 is switched. FIG. 12 shows nine lattice strips arranged in a horizontal direction. FIG. 13 shows three lattice strips arranged in a horizontal direction.

Figure 14:
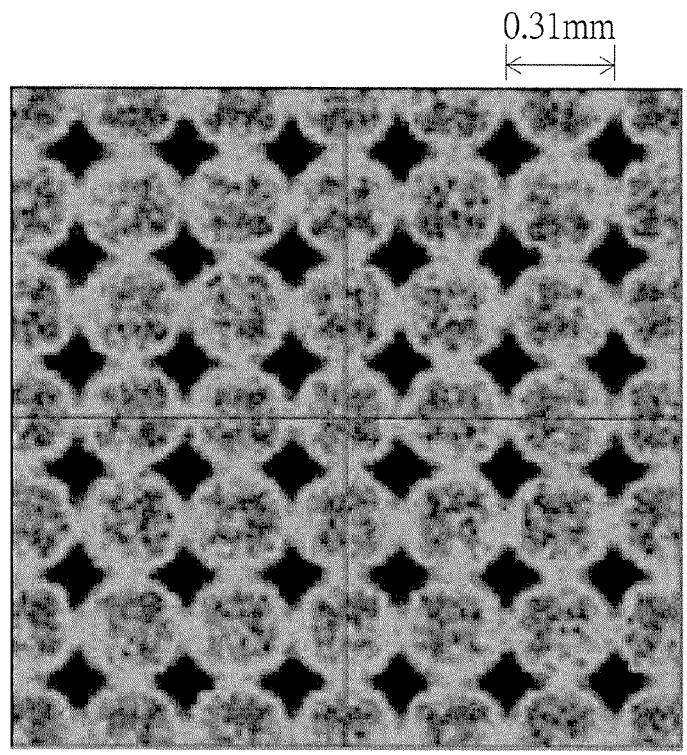
FIG. 14 and FIG. 15 are schematic brief views illustrating light field sub-images output by the light field sensor of the light field camera depicted in FIG. 1 at a first position and a second position according to another embodiment of the invention.
Figure 15:
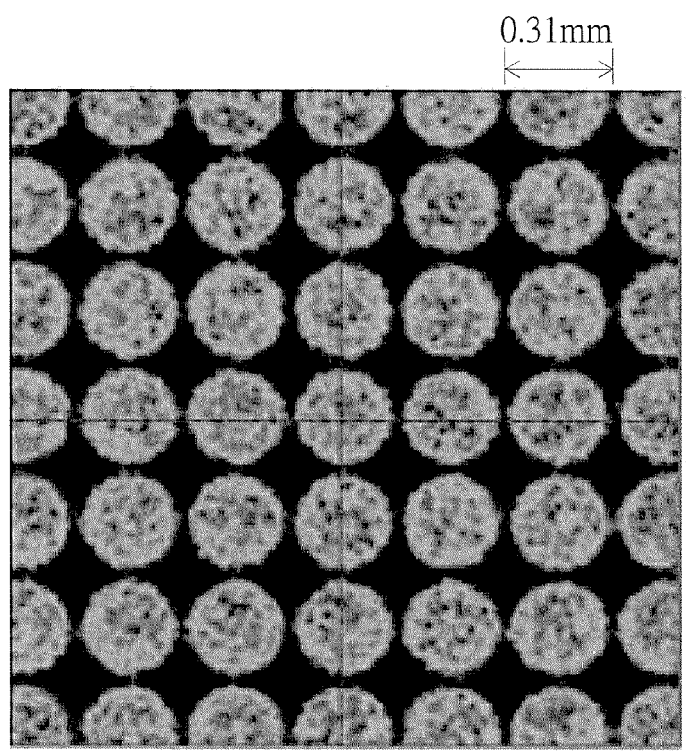
Figure 16:
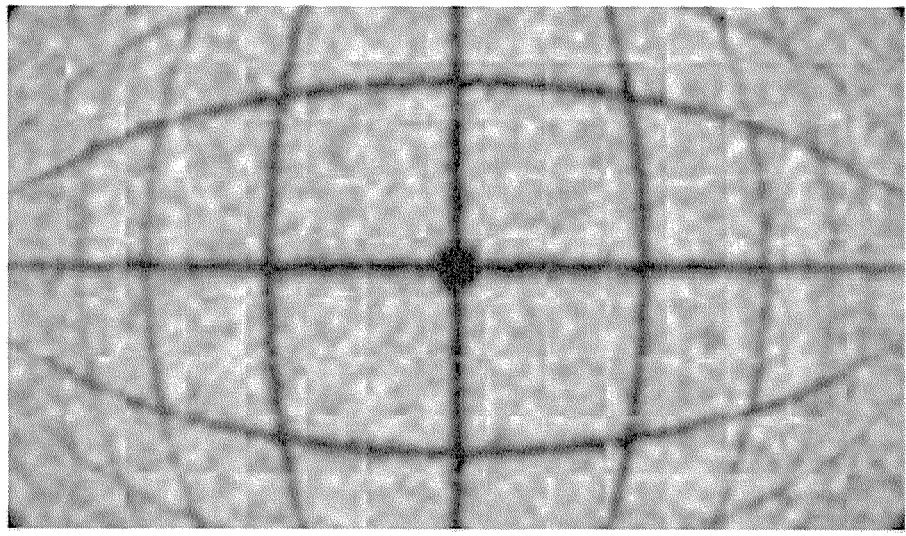
FIG. 16 and FIG. 17 are schematic brief views illustrating light field images output by the light field sensor of the light field camera depicted in FIG. 1 at a first position and a second position according to another embodiment of the invention.
Figure 17:
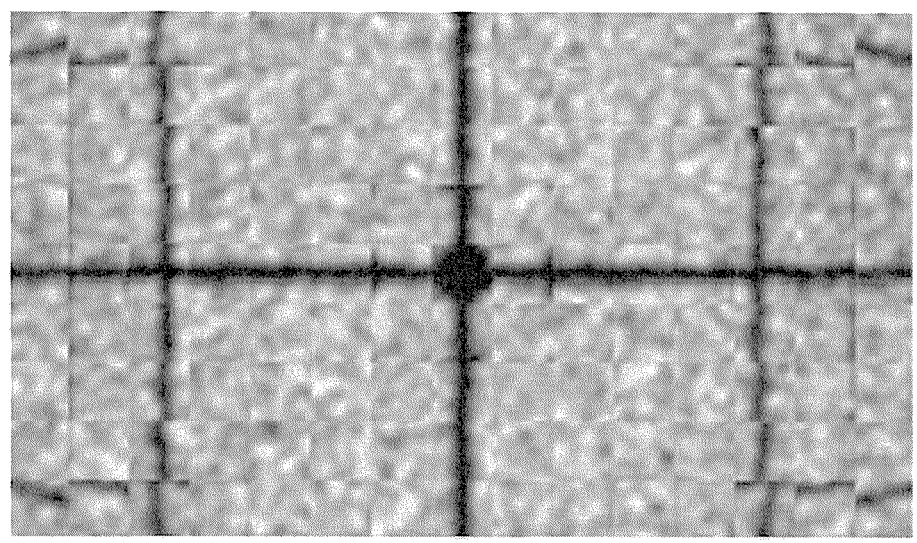

FIG. 14 and FIG. 15 are schematic brief views illustrating light field sub-images output by the light field sensor of the light field camera at a first position and a second position according to another embodiment of the invention. FIG. 16 and FIG. 17 are schematic brief views illustrating light field images output by the light field sensor of the light field camera at a first position and a second position according to another embodiment of the invention. In the embodiment of the invention, the main lens group of the lens module 110 is a fixed-focus lens group, for instance. When $0.9 \le k \le 1.1$, i.e., the range of the focal length $f_{MLA}$ of the lens array 122 can be calculated according to the formula (1) as 0.485 mm$\le f_{MLA} \le$0.804 mm. Here, the exit pupil distance $P_{EXP}$ of the lens module 110 is 15.276 mm. In the embodiment, the focal length $f_{MLA}$ of the lens array 122 is 0.635 mm, for instance, and the pitch P of two adjacent light field sub-images is 0.31 mm, for instance. The magnification ratio m of the lens array 122 is 0.2, for instance. In FIG. 10, when the light field sensor 120 is at the first position, the size Ø1 of the first light field sub-image is 0.31 mm, for instance. In FIG. 11, when the light field sensor 120 is at the second position, the size Ø2 of the second light field sub-image is 0.3 mm, for instance. Hence, k is 0.96, i.e., k=0.3/0.31=0.96.

In FIG. 14, the proportion of the dead zone in the light field sub-image is:

$$\frac{0.31^2 - \pi(0.31/2)^2}{0.31^2} = 21.4\%$$

In FIG. 15, the proportion of the dead zone in the light field sub-image is:

$$\frac{0.31^2 - \pi(0.3/2)^2}{0.31^2} = 26.4\%$$

Therefore, in the embodiment, when the light field sensor 120 is at the first position and at the second position, the proportion of the dead zone in the light field image is 21.4% and 26.4%, respectively. In the embodiment, when the light field sensor is at the first position and in the second position, the difference in the utilization rate of the pixels is lessened, and hence the resolution of the light field image obtained when the light field sensor is at the first position is similar to the resolution of the light field image obtained when the light field sensor is at the second position.

With reference to FIG. 16 and FIG. 17, FIG. 16 shows the light field image output and rendered by the light field sensor of the light field camera at the first position, and FIG. 17 shows the light field image output and rendered by the light field sensor of the light field camera at the second position It can be learned from FIG. 16 and FIG. 17 that the effects of changing the views of the light field camera can be achieved after the position of the light field sensor 120 is switched. FIG. 16 shows nine lattice strips arranged in a horizontal direction. FIG. 17 shows three lattice strips arranged in a horizontal direction.

In the embodiment of the invention, the main lens group of the lens module 110 is a zooming lens group, for instance, and the range of the focal length is 2.52 mm$\le$fmain (wide-end)$\le$3.67 mm. Besides, in the embodiment, the exit pupil distance $P_{EXP}$ of the zooming lens group at a wide-end is 15.276 mm, and the exit pupil distance $P_{EXP}$ of the zooming lens group at a tele-end is 16.102 mm. Given that the zooming lens group of the lens module 110 is at the wide-end, and $0.9 \le k \le 1.1$, i.e., the variation range of the size of the rendered light field image at the first position and the second position is between 0.9-1.1, the range of the focal length $f1_{MLA}$ of the lens array 122 can be calculated according to the formula (1) as 0.38 mm$\le f1_{MLA} \le$0.82 mm. Given that the zooming lens group of the lens module 110 is at the tele-end, and $0.9 \le k \le 1.1$, i.e , the variation range of the size of the rendered light field image at the first position and the second position is 0.9-1.1, the range of the focal length $f2_{MLA}$ of the lens array 122 can be calculated according to the formula (1) as 0.51 mm$\le f2_{MLA} \le$0.852 mm. Accordingly, given either $f1_{MLA}$ or $f2_{MLA}$, favorable quality of the light field image before and after the position of the light field sensor 120 is switched can be guaranteed, and the proportion of the dead zone or the crosstalk zone in the light field image can be lowered down.

In the embodiment, the combination of the zooming lens group may be implemented in form of any appropriate combination of lenses in the pertinent field, which should not be considered as a limitation to the invention. Teachings and suggestions of the detailed structure of the lens combination and the way to implement the lens combination should be known to people in the pertinent field and hence may not be further provided.

In the embodiments of the invention, optical parameters or structural parameters of each light field camera are exemplary, and the invention is not limited thereto.

To sum up, the light field camera provided herein may achieve at least one of advantages or effects as listed below. In an embodiment of the invention, when the light field sensor is at the first position or the second position, the conjugate plane relation between the light field sensor and the imaging plane of the lens module is satisfied. Before and after the position of the light field sensor is switched, the effects of changing the view angles of the output image can be achieved, the variations in the size of the light field sub-images during the switching operation can be reduced, the proportion of the invalid dead zone or crosstalk zone can be lowered down, and the utilization rate of the pixels can be enhanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. These claims may refer to use "first", "second", etc. following with noun or element. Such terms should be understood as a nomenclature and should not be construed as giving the limitation on the number of the elements modified by such nomenclature unless specific number has been given. Moreover, no element and component in the disclosure is intended to be dedicated to the public regardless of whether the element or component is explicitly recited in the following claims.

What is claimed is:

1. A light field camera comprising:
   a lens module is located between an object side and an image side, and configured to generate a middle image;
   a light field sensor comprising:
      a lens array arranged between the lens module and the image side, and generating a light field image according to the middle image; and
      an image sensor device arranged at the image side and configured to sense the light field image; and
   a position adjuster configured to adjust a position of the light field sensor, wherein when the light field sensor is at a first position, the light field image comprises a first light field sub-image, and when the light field sensor is at a second position, the light field image comprises a second light field sub-image, wherein a relation between a focal length $f_{MLA}$ of the lens array and an exit pupil distance $P_{EXP}$ of the lens module satisfies:

$$0.7 \leq \frac{f_{MLA}}{P_{EXP}} \leq 1.3.$$

2. The light field camera of claim 1, wherein a ratio of the focal length $f_{MLA}$ of the lens array to the exit pupil distance $P_{EXP}$ of the lens module is determined according to a ratio k of a size of the second light field sub-image to a size of the first light field sub-image and a magnification ratio m of the lens array.

3. The light field camera of claim 1, wherein a distance from the middle image to the lens array on an optical axis is p, a distance from the lens array to the image sensor device on the optical axis is q, and a magnification ratio m of the lens array is equal to q/p.

4. The light field camera of claim 1, wherein when the light field sensor is at the first position, the middle image is generated at a position behind the light field sensor, and when the light field sensor is at the second position, the middle image is generated at a position between the lens module and the light field sensor.

5. The light field camera of claim 1, wherein the lens module is selected from one of a fixed-focus lens group and a zooming lens group.

6. The light field camera of claim 5, wherein the lens module is the fixed-focus lens group, and the focal length $f_{MLA}$ of the lens array satisfies: 0.22 mm $\leq f_{MLA} \leq$ 1.198 mm.

7. The light field camera of claim 6, wherein when the light field sensor is at the first position and at the second position, a proportion of a dead zone in the light field image is 22% and 55%, respectively.

8. The light field camera of claim 5, wherein the lens module the fixed-focus lens group, $0.9 \leq k \leq 1.1$, and the focal length $f_{MLA}$ of the lens array satisfies: 0.485 mm $\leq f_{MLA} \leq$ 0.804 mm.

9. The light field camera of claim 8, wherein when the light field sensor is at the first position and at the second position, a proportion of a dead zone in the light field image is 21.4% and 26.4%, respectively.

10. The light field camera of claim 5, wherein the lens module the zooming lens group, $0.9 \leq k \leq 1.1$, and the focal length $f_{MLA}$ of the lens array satisfies: 0.51 mm $\leq f_{MLA} \leq$ 0.82 mm.

11. The light field camera of claim 10, wherein when the zooming lens group is at a wide-end, the focal length of the lens array is $f1_{MLA}$, when the zooming lens group is at a tele-end, the focal length of the lens array is $f2_{MLA}$, 0.38 mm $\leq f1_{MLA} \leq$ 0.82 mm, and 0.51 mm $\leq f2_{MLA} \leq$ 0.85 mm.

12. The light field camera of claim 10, wherein a focal length of the zooming lens group is $f_{main}$, and 0.252 mm $\leq f_{main} \leq$ 0.367 mm.

13. The light field camera of claim 10, wherein the exit pupil distance $P_{EXP}$ of the zooming lens group at a wide-end is 15.276 mm and the exit pupil distance $P_{EXP}$ of the zooming lens group at a tele-end is 16.102 mm.

14. The light field camera of claim 1, wherein when the light field sensor is respectively at the first position and the second position, the pitch between the lens array and the image sensor device on an optical axis varies.

15. The light field camera of claim 1, wherein the relation between the focal length $f_{MLA}$ of the lens array and the exit pupil distance $P_{EXP}$ of the lens module satisfies:

$$0.9 \leq \frac{f_{MLA}}{P_{EXP}} \leq 1.1.$$

* * * * *